INVENTORS
HERBERT F. VOLK
ROBERT A. MERCURI

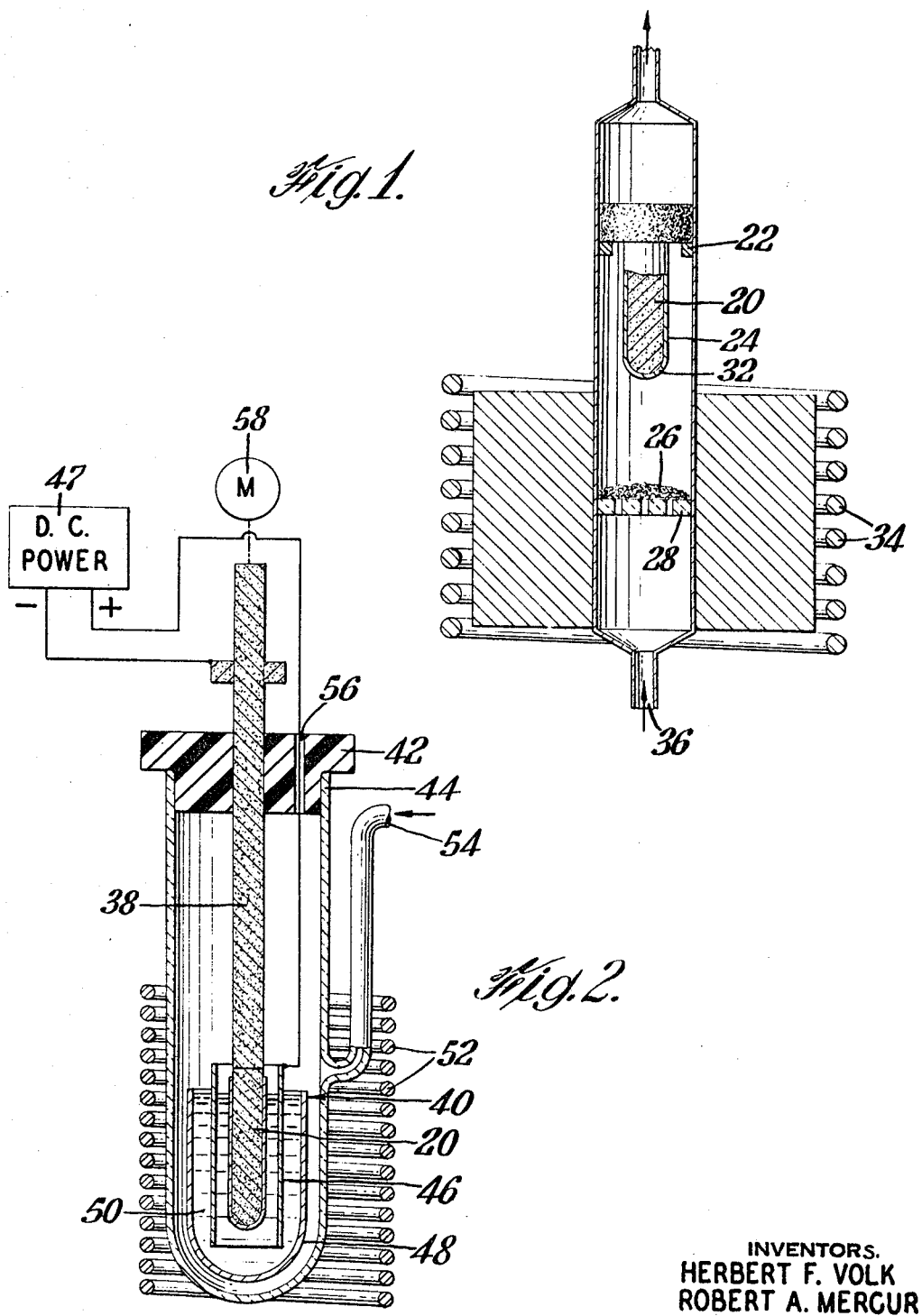

United States Patent Office 3,446,607
Patented May 27, 1969

3,446,607
IRIDIUM COATED GRAPHITE
Herbert F. Volk, Parma, and Robert A. Mercuri, Brookpark, Ohio, assignors to Union Carbide Corporation, a corporation of New York
Filed Sept. 14, 1965, Ser. No. 487,165
Int. Cl. C23c 1/10, 7/00
U.S. Cl. 29—195        2 Claims The present invention relates to coated graphite articles which exhibit superior properties at high temperature. More particularly, the present invention relates to iridium coated graphite articles.

Graphite is a well known structural material which lends itself advantageously to high temperature applications in view of the exceptional physical and mechanical properties which it exhibits under such conditions. However, in oxidizing environments, graphite is readily attacked at high temperatures with the resulting formation of gaseous oxides which do not afford any protection against further oxidation.

Previous efforts to overcome this problem, as described in U.S. patent application Ser. No. 418,297, involve the coating of graphite with iridium. The iridium coating of the aforementioned patent application is provided by applying a slurry of finely divided powder to a graphite surface; heating the slurry-coated graphite to drive off the liquid slurry constituents and thereby cause the iridium powder to adhere to the graphite; and subsequently heating the graphite substrate to a temperature between 1730° C. and 2200° C. to cause the iridium particles to coalesce and become bonded to the graphite. Specific examples showing iridium coating of graphite are provided in application Ser. No. 418,297.

While the aforementioned iridium coatings provide a graphite article which is highly resistant to oxidation in addition to having other advantageous high temperaure properties, it has been found that such coatings at times have pores which can lead to attack of the graphite substrate after extended service.

It is therefore an object of the present invention to provide a graphite article having an iridium coating which is essentially free of pores.

It is another object of the present invention to provide a graphite article with a strongly adhering iridium coating, the coated article being resistant to thermal shock.

Figure 3:
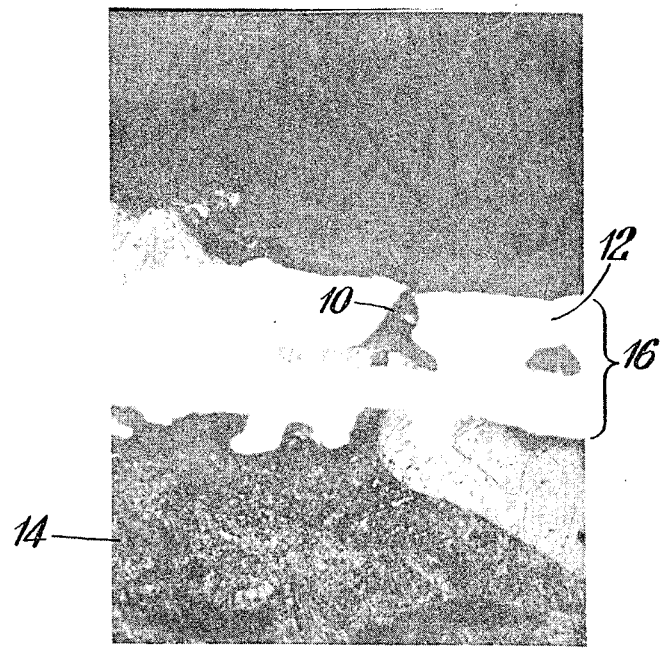
Figure 4:
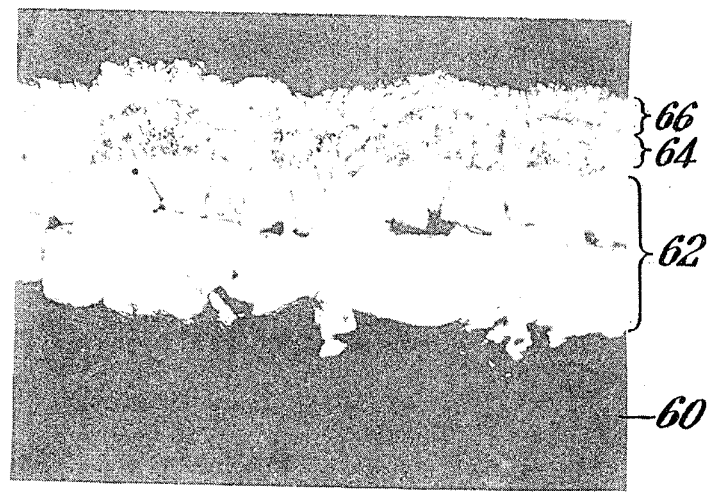

Other objects will be apparent from the following description and claims taken in conjunction with the drawing in which FIGURE 1 shows, somewhat schematically, vapor-plating apparatus suitable for use in the practice of the present invention FIGURE 2 shows, somewhat schematically, electro-plating apparatus suitable for use in the practice of the present invention FIGURE 3 is a photograph, original magnification 250× of iridium coated graphite wherein voids appear in the iridium coating and FIGURE 4 shows a photograph, original magnification 250× of iridium coated graphite in accordance with the present invention.

An iridium coated graphite article in accordance with the present invention comprises a graphite substrate having in contact therewith a first coating of sintered particles of iridium; an intermediate coating of vapor plated iridium; and an outer coating of electro-plated iridium.

This composite article is characterized in that the iridium coating is dense, essentially free of voids, strongly adherent to the graphite substrate and resistant to thermal shock.

In a particular embodiment of the present invention, a graphite substrate is provided wih an iridium coating by applying a slurry of finely divided iridium powder to a graphite surface. The slurry coated graphite article is then heated to drive off the liquid slurry constituents to thereby cause the iridium powder to adhere to the graphite and subsequently, the graphite substrate is heated in the range of 1730° C. to 2130° C.

In providing this initial coating, the following procedure, which is disclosed in the aforementioned application Ser. No. 418,297 is used. In preparing the slurry, for example fine iridium particles, suitably sized on the average from 1.0 to 3.0 microns (as measured by Fisher Subsieve) prepared by dry milling larger (−325 mesh) particles, are incorporated into a slip by ball milling the fine iridium particles with the suspending liquid for about two hours. A suitable suspending liquid is xylene, as the slip vehicle, containing a suitable deflocculent such as cyclopentadiene resin. Other suitable slip vehicles are toluene, benzene, alcohol and high flash naphtha and other suitable deflocculents are glycerine, stearic acid, polyvinyl alcohol. In general, a ratio of slip vehicle to defloculent of about 4:1 by volume, and an iridium content in the suspending liquid of about 87 percent by weight provides highly satisfactory results.

The graphite substrate to be coated, which can be in the form of rods, heater elements, crucibles and like, are dipped in the slurry. Alternatively, the slurry may be applied to the graphite body by spraying or painting.

In any event, the slurry is applied to the substrate surface until the surface is covered with a suitable iridium layer e.g. between 0.0001 and 0.003 inch thick.

The slurry-coated graphite article is dried by heating in a non-reactive atmosphere, e.g., argon, to cause the liquid constituents of the slurry to be vaporized whereupon the iridium particles are caused to adhere to the graphite substrate. Heating, at a rate of about 100° C./hr., to 400° C. ±20° C. and holding at a temperature for about one hour provides a suitable preliminary coating. Heating at rates faster than 175° C. per hour is not recommended since higher heating rates can possibly cause disruption of this preliminary coating.

Following the aforedescribed heating treatment, the graphite substrate is further heated, in a non-reactive atmosphere, in the range of 1730° C. to 2130° C. to cause sintering of the deposited iridium and bonding of the iridium particle to each other and to the graphite. Heating at a temperature of about 2120° C. for about 30 minutes is generally satisfactory. The resultant iridium coating is essentially graphite-free and continuous although the identity of original iridium particles can be detected visually.

The sintered iridium coated graphite article obtained in the foregoing manner is characterized by having a coating which is strongly adhering and very resistant to thermal shock.

However, coatings prepared in this manner, an exemplary one of which is shown in FIGURE 3, are characterized by having occasional pores 10 in the iridium coating 12. The graphite substrate is shown at 14 and the overall thickness of the sintered iridium coating as shown at 16 is 0.002 inch.

The pores 10, represent weak points in the coating and, as can be readily appreciated can lead to attack of the graphite substrate after extended exposure to high temperature oxidizing operating conditions.

In attempting to overcome the problem of voids in the iridium coating various approaches were tried. For example, electro-plating of the initially coated substrate with iridium from a fused salt bath was considered but since salt penetration and corrosion occurs if the pores in the coating expose the graphite substrate, this technique was found impractical.

Vapor plating of the substrate instead of providing an initial sintered coating was also considered. However, while such coatings are dense and essentially free of voids, the vapor plated coating does not adhere as well as a sintered coating, consequently thermal shock resistance is adversely affected.

Upon further investigation, however, it was found that if iridium was vapor plated onto the initial sintered iridium coating, the adherence of this coating was excellent and at the same time the voids were filled or bridged. Further, the vapor plated substrate can be readily electro-plated to provide a dense, strongly adhering outer coating without any salt penetration and attack of the graphite substrate.

In providing a vapor plating of iridium on an article, initially provided with a sintered iridium coating, apparatus of the type shown in FIGURE 1 can be used. With reference to FIGURE 1, the initially coated graphite substrate 20 is supported at 22 in a vertical quartz tube 24. Iridium carbonyl, $Ir_4(CO)_{12}$, or iridium chlorocarbonyl, $Ir(CO)_2Cl_2$, is placed at 26 on a fritted quartz disk 28. The graphite substrate 20, having an initial sintered iridium coating 32 is heated to a temperature in the range of from 300° C. to 800° C. by means of heating coils 34. Carbon monoxide is introduced at 36 to provide a carbon monoxide atmosphere and the carbonyl is sublimated by heating to a temperature in the range of 175° C. to 220° C., preferably about 200° C. The pressure of carbon monoxide can range from about one micron to one atmosphere, the lower pressures permitting sublimation of carbonyl at lower temperatures in the aforesaid range and the higher pressures requiring higher temperatures. The carbon monoxide gas sweeps the carbonyl vapor into contact with the heated iridium coated substrate and causes iridium to be vapor plated thereon. A vapor plated layer of about 0.0005 inch is ordinarily sufficient to fill or bridge any voids in the initial coating.

After a vapor plated coating of at least 0.0005 inch is provided on the sintered iridium coating, the coated graphite article is further treated by electro-plating.

Suitable apparatus is shown in FIGURE 2 wherein the iridium coated graphite substrate 20 is shown with lead-in rod 38 connected as a cathode in an electro-plating cell indicated generally at 40. The cylindrical iridium coated graphite substrate is supported in a Teflon stopper 42 which also serves as a cap for the quartz outer envelope 44. The anode 46 is a semi-cylinder of iridium and both the anode and cathode are connected to a direct current power supply 47. An alumina container 48 holds an iridium-containing electrolyte 50 which is suitably formed by passing alternating current between two iridium electrodes immersed in a molten bath containing 70% by weight sodium cyanide and 30% by weight potassium cyanide for a time sufficient to obtain an iridium content of 6 grams per liter. With the electrolyte in container 48, heated to about 600° C. by coils 52, current is passed through the electrolye and iridium is deposited on the cathode to provide the graphite substrate 20 with an outer electro-plated coating of the desired thickness. An electro-plated coating thickness of about 0.0003 to 0.005 inch is generally suitable. During cell operation, as shown in FIGURE 2, the cell is purged with argon which is introduced at 54 and exits at 56. Also, during cell operation the graphite substrate is rotated by means of motor 58 so that uniform coating is obtained.

The following conditions have been found suitable in providing an electro-plated iridium coating.

TABLE I

| | |
|---|---|
| Electrolyte temperature | 600°. |
| Outer envelope | 4 cm. I.D. x 30 cm. |
| Electrolyte container | 3.8 cm. I.D. x 16.5 cm. |
| Graphite substrate (cathode) | 0.5 inch diameter. |
| Anode (semi-cylinder) | Iridium sheet: 0.025 cm. thick 14 cm. long 1.2 cm. I.D. |
| Cathode current density | 10 ma./cm.$^2$. |
| Cathode rotation | 60 r.p.m. |
| Cell operating time | 1 hour for 1 mil. coating. |

Following the aforedescribed practice, a graphite substate in accordance with the present invention was provided with a first sintered coating about 1.5 mils thick, an intermediate vapor plated coating of about 0.4 mil and an outer electro-plated coating of about 0.4 mil. This article was examined and found to be essentially free of pores. A photograph of this article is shown in FIGURE 4 wherein 60 indicates the graphite substrate, 62 shows the location of the sintered first coating, 64 indicates the location of the intermediate vapor plated coating and 66 indicates the outer electro-plated coating.

The actual article which was originally in the form of a graphite cylinder 0.5 inch in diameter and about 4 inches long was exposed, after coating, to an oxygen rich $O_2$—$CH_4$ flame at 2000° C. for ten minutes. The specimen showed practically no weight loss and the iridium coating and graphite substrate were unaffected.

What is claimed is:

1. A graphite substrate resistant to oxidation at temperatures up to 2000° C., said substrate having an essentially pore-free coating of iridium, said coating comprising an inner layer adjacent said graphite substrate formed of sintered finely divided particles of iridium, an intermediate layer of vapor plated iridium, and an outer layer of electro-plated iridium.

2. A method of providing a graphite substrate with an adherent essentially pore-free iridium coating which comprises:
   (1) applying a slurry of finely divided iridium powder to a graphite substrate
   (2) heating the graphite substrate and iridium powder to produce a coating of sintered iridium on said graphite substrate
   (3) vapor plating the sintered iridium coating with iridium and
   (4) electro-depositing a layer of iridium on the vapor plated iridium to thereby provide the graphite substrate with a coating comprising an inner layer of sintered iridium particles, an intermediate layer of vapor plated iridium and an outer layer of electro-plated iridium.

References Cited

UNITED STATES PATENTS

| | | | |
|---|---|---|---|
| 2,075,477 | 3/1937 | Smith | 204—38.2 X |
| 2,737,463 | 3/1956 | Lawton et al. | 117—130 |
| 2,929,766 | 3/1960 | Withers et al. | 204—32 |
| 3,294,654 | 12/1966 | Norman et al. | 204—38 |
| 3,313,716 | 4/1967 | Pschera | 204—38 |

OTHER REFERENCES

Products Finishing, June 1963, pp. 54–57.
Metal Finishing, July 1962, pp. 32, 37 and 43.

JOHN H. MACK, *Primary Examiner.*

W. VAN SISE, *Assistant Examiner.*

U.S. Cl. X.R.

29—191; 117—228; 136—122; 204—38, 47, 290, 294; 252—447